United States Patent
Misso et al.

[11] Patent Number: 6,134,077
[45] Date of Patent: Oct. 17, 2000

[54] LATCH FOR DISC DRIVES

[75] Inventors: Nigel F. Misso, Bethany; Steve S. Eckerd, Oklahoma City, both of Okla.

[73] Assignee: Seagate Technology, Inc., Scotts Valley, Calif.

[21] Appl. No.: 09/109,301

[22] Filed: Jun. 30, 1998

Related U.S. Application Data

[60] Provisional application No. 60/075,697, Feb. 20, 1998.

[51] Int. Cl.[7] .................................................. G11B 5/54
[52] U.S. Cl. ................................................... 360/105
[58] Field of Search ...................... 360/104–106

[56] References Cited

U.S. PATENT DOCUMENTS

| | | |
|---|---|---|
| 4,647,997 | 3/1987 | Westwood . |
| 5,043,834 | 8/1991 | Kubo et al. . |
| 5,187,627 | 2/1993 | Hickox et al. . |
| 5,224,000 | 6/1993 | Casey et al. . |
| 5,231,556 | 7/1993 | Blanks . |
| 5,404,636 | 4/1995 | Stefansky et al. . |
| 5,623,384 | 4/1997 | Hickox et al. ............................ 360/105 |
| 5,694,271 | 12/1997 | Stefansky ................................. 360/105 |

*Primary Examiner*—Allen T. Cao
*Attorney, Agent, or Firm*—Crowe & Dunlevy

[57] ABSTRACT

A latch for a disc drive, wherein the disc drive has an actuator that is pivotally supported for moving an array of read/write heads radially across a data storage disc between a parked location and a data storage location, the parked location providing a landing surface for the read/write heads when the disc drive is non-operational, the latch limiting the actuator from pivoting so that the read/write heads remain in the parked location while the disc drive is non-operational. The latch has a base member enabling attachment to the disc drive, the base supporting an inner stop and an outer stop which limit the actuator rotation, the base further supporting a cantilevered latch arm which biases a latch finger to a position whereat the latch finger and the inner stop form a latching groove and the latch finger and the outer stop form an unlatching groove, the actuator being confined by the latching groove in the latched mode and being confined by the unlatching groove in the unlatched mode.

14 Claims, 3 Drawing Sheets

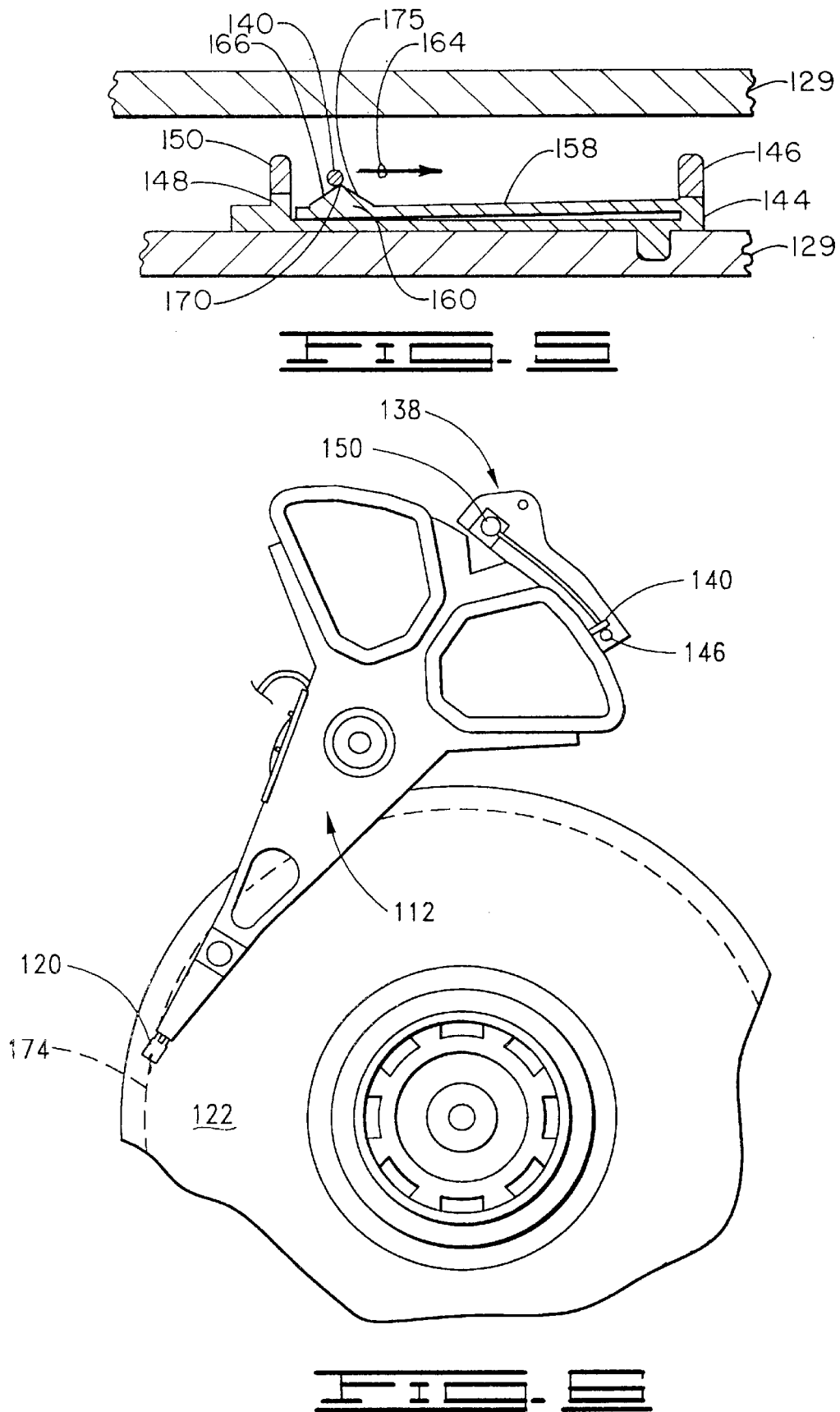

LATCH FOR DISC DRIVES

RELATED APPLICATIONS

This application claims the benefit of U.S. Provisional Application Ser. No. 60/075,697 entitled ONE PIECE LATCH AND STOPS FOR DISC DRIVES, filed Feb. 20, 1998.

FIELD OF THE INVENTION

The present invention relates generally to the field of disc drive data storage devices, and more particularly but not by way of limitation, to a latch for an actuator of a disc drive to retain the read/write heads in a parked location during times when the disc drive is non-operational.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly. The surfaces of the stacked discs are accessed by the read/write heads which are mounted on a complementary stack of actuator arms which form a part of an actuator assembly. The actuator assembly generally includes head wires which conduct electrical signals from the read/write heads to a flex circuit which, in turn, conducts the electrical signals to a flex circuit connector mounted to a disc drive base deck.

When the disc drive is not in use, the read/write heads are brought to rest upon parked locations, which are separate from the data storage locations of the discs. Typically, each parked location provides a landing zone on each of the disc surfaces where the read/write heads are positioned before the rotational velocity of the spinning discs decreases below a threshold velocity which sustains the air bearing. The parked location is typically located near the inner diameter of the discs.

Once the heads are positioned in the parked location, it is necessary to secure the actuator assembly by a latching arrangement to prevent the heads from subsequently moving out onto the data locations of the discs while the disc drive is not in use. Latching arrangements are well known in the art and have included various configurations of springs, solenoids and magnets to secure and release the actuator. For example, see U.S. Pat. No. 5,187,627 entitled MAGNETIC LATCH AND CRASH STOP, issued Feb. 16, 1993, to Hickox and Stram; U.S. Pat. No. 5,224,000 entitled CRASH STOP AND MAGNETIC LATCH FOR A VOICE COIL ACTUATOR, issued Jun. 29, 1993, to Casey and West; and U.S. Pat. No. 5,231,556 entitled SELFHOLDING LATCH ASSEMBLY, issued Jul. 27, 1993, to Blanks. All of these references are assigned to the assignee of the present invention.

Associated problems with such devices have limited the application in which they can be used. For example, a continuing trend in the industry is the reduction in size of modern disc drives. As a result, the discs of modern disc drives increasingly have smaller diameters and tighter spacings. Although providing increasing amounts of storage capacity, narrow vertical spacing of the discs gives rise to a problem of increased sensitivity to external mechanical shock. Additionally, as disc drives continue to decrease in size, smaller heads, thinner substrates, longer and thinner actuator arms and thinner gimbal assemblies continue to be incorporated into the disc drives. These factors significantly increase the need to protect the disc drives from incidental contact between the actuator arm/gimbal assemblies and the disc surfaces. Furthermore, market requirements demand ever increasing non-operating shock performance.

Consequently, there has not been available a latching device which will universally meet the ever increasing demands of disc latching that will protect the discs from the deleterious effects of non-operational shock such as can occur during shipping and handling. Protection from this and other non-operating mechanical shocks continue to be a major problem to the industry. Of particular benefit would be a latch of a unitary construction with no articulating components so as to reduce the cost and complexity associated with mechanism providing the latching function.

Accordingly, there is a need for an improved latch apparatus for a disc drive to reduce the susceptibility of damage to the disc drive as a result of non-operating mechanical shocks.

SUMMARY OF THE INVENTION

The present invention provides a latch for a disc drive assembly, wherein the disc drive assembly has a disc pack with a plurality of data storage discs, each having a parked location and a data storage location. An actuator of the disc drive assembly is rotatably supported in a plane parallel to that of the discs and supports an array of read/write heads in radial movement across the discs in data reading and writing relationship thereto.

The disc drive has a voice coil motor that interacts with the actuator to move the read/write heads between the parked location and the data storage location. The parked location provides a landing zone for the read/write heads when the disc drive is non-operational.

The voice coil motor includes a magnet assembly having a pair of opposing magnet members supported by a pair of opposing pole members. The latch has a base supported by one of the pole members, and the latch is generally interposed between the pole members.

The latch has an inner stop which abuttingly engages a pin supported by the actuator to limit the rotation of the actuator at an inner extremity of the parked location. The latch furthermore has an outer stop which abuttingly engages the pin to limit the rotation of the actuator to radial positions within an outer extremity of the data storage location.

A cantilevered latch arm is positioned medial in the inner and outer stops, having a latch finger which is biased by the latch arm to form a latching groove and an unlatching groove. In a latched mode, pivoting of the actuator is limited by the constraint of the pin within the latching groove. To unlatch the actuator, the voice coil motor moves the pin into pressing engagement with the latch finger with a force sufficient to overcome the cantilevered bias of the latch arm. The latch finger is thereby displaced and the pin passes into the unlatching groove.

These and other advantages and features of the present invention will be apparent from the following description when read in conjunction with the drawings and appended claims.

BRIEF DESCRIPTION OF THE DRAWINGS

FIG. 5 is a partial section view of the latch of FIG. 4 schematically showing the actuator moving from the latched to the unlatched mode.

FIG. 6 is a top view of a portion of the disc drive of FIG. 1 showing the actuator assembly at the outer extremity of the data storage location.

DETAILED DESCRIPTION

Figure 1:
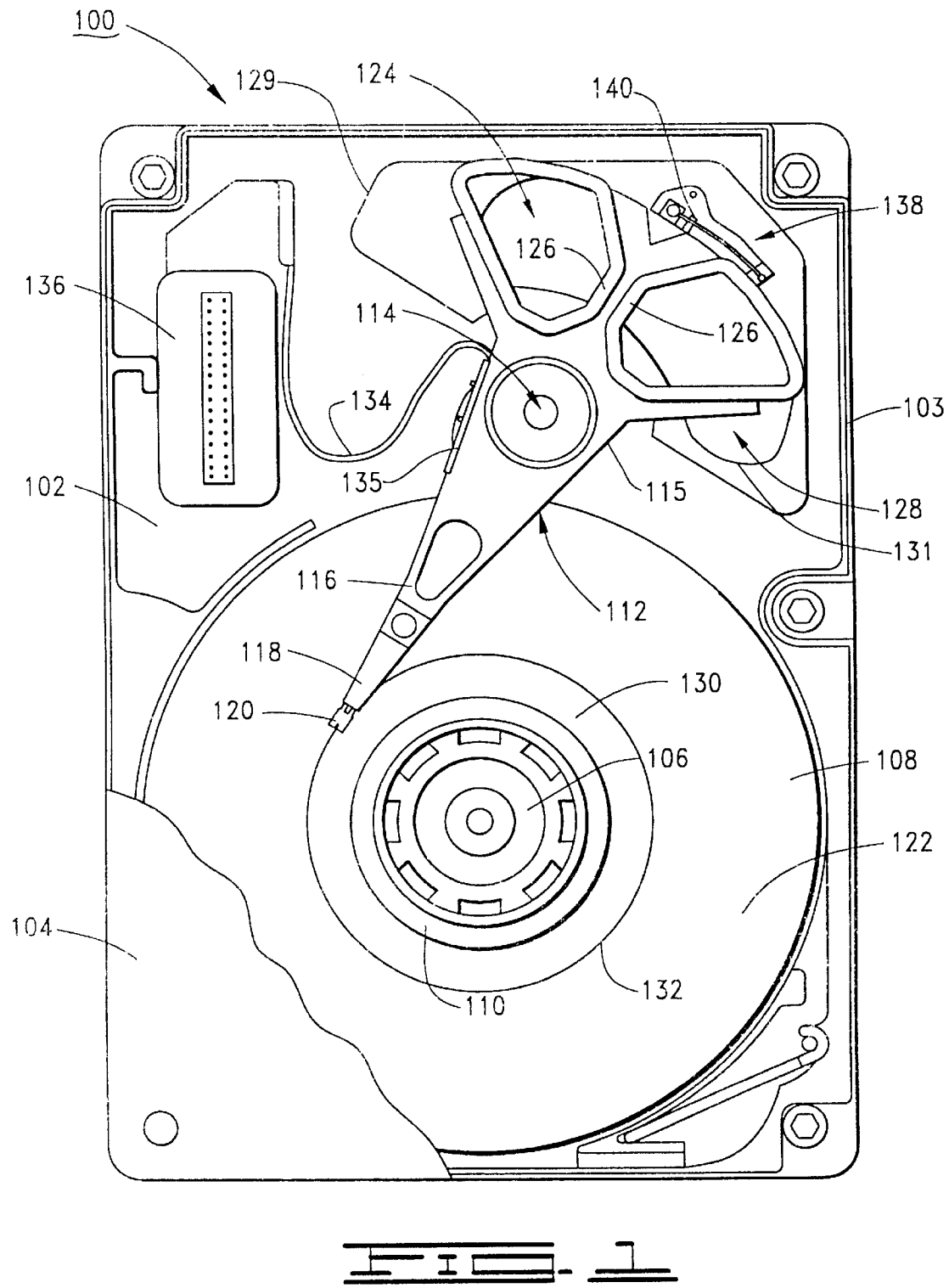
FIG. 1 is a top view of a disc drive constructed in accordance with the present invention.

Referring to the drawings in general, and more particularly to FIG. 1, shown therein is a top view of a disc drive 100 constructed in accordance with a preferred embodiment of the present invention. The disc drive 100 includes a base deck 102 to which various disc drive components are mounted, and a top cover 104, which together with the base deck 102 and a perimeter gasket 103 provide a sealed internal environment for the disc drive 100. The top cover 104 is shown in a partial cut-away fashion to expose selected components of interest. It will be understood that numerous details of construction of the disc drive 100 are not included in the following description, as such, they are well known to those skilled in the art and are unnecessary for the purpose of describing the present invention.

Mounted to the base deck 102 is a spindle motor 106 to which a plurality of discs 108 are mounted and secured by a clamp ring 110 for rotation at a constant high speed. Adjacent the discs 108 is an actuator assembly 112 which rotates about a pivot bearing assembly 114 in a plane parallel to the discs 108. The actuator assembly 112 includes an E-block 115 that is supported by the pivot bearing assembly 114. The E-block 115 has actuator arms 116 (only one shown) that support load arm assemblies 118. The load arm assemblies 118 in turn support read/write heads 120, with each of the read/write heads 120 adjacent a surface of one of the discs 108. As mentioned hereinabove, each of the discs 108 has a data storage location with a data recording surface 122 divided into concentric circular data tracks (not shown), and the read/write heads 120 are positionably located adjacent data tracks to read data from, or write data to, the tracks.

The actuator assembly 112 is controllably positioned by a voice coil motor (VCM) 124, the VCM 124 having an actuator coil 126 immersed in the magnetic field generated by a magnet assembly 128. A magnetically permeable flux path, such as provided by a steel plate 129 (sometimes referred to as pole 129), is mounted above and below the actuator coil 126 to support a magnet member 131 and to complete the magnetic circuit of the VCM 124. It will be noted the top pole 129 and top magnet member 131 are omitted in FIG. 1 for clarity in showing the complete actuator assembly 112. When controlled current is passed through the actuator coil 126, an electromagnetic field is set up which interacts with the magnetic circuit of the VCM 124 to cause the actuator coil 126 to move relative to the magnet assembly 128 in accordance with the well-known Lorentz relationship. As the actuator coil 126 moves, the actuator assembly 112 rotates about the pivot bearing assembly 114 causing the actuator arms 116 to move the read/write heads 120 adjacent to, and across, the discs 108. Located near the clamp ring 110 are landing zones 132, which are designated areas where the read/write heads 120 come to rest when the disc drive 100 is non-operational. The landing zones 132 prevent the read/write heads 120 from damaging the data recording surfaces.

To provide the requisite electrical conduction paths between the read/write heads 120 and disc drive read/write circuitry (not shown), head wires (not separately shown) are routed on the actuator assembly 112 from the read/write heads 120, along the load arm assemblies 118 and the actuator arms 116, to a flex circuit 134. The head wires are secured by way of a suitable soldering process to corresponding pads of a printed circuit board (PCB) 135 of the flex circuit 134. In turn, the flex circuit 134 is connected to a flex circuit bracket 136 in a conventional manner which, in turn, is connected through the base deck 102 to a disc drive PCB (not shown) mounted to the underside of the base deck 102. The disc drive PCB provides the disc drive read/write circuitry which controls the operation of the read/write heads 120, as well as other interface and control circuitry for the disc drive 100.

During times when the disc drive is non-operational it is desirable to provide a latch 138 to latchingly retain the actuator assembly 112 in a position whereby the read/write heads 120 remain within the parked location. It will be noted that when the disc drive 100 is non-operational the read/write heads 120 directly contact the corresponding discs 108 because no air current from the disc rotation is available to sustain the air bearing. If the actuator assembly 112 were to rotate during the non-operational mode of the disc drive 100, the read/write heads 120 would contact the data recording surface 122 in the data storage location. Physical contact with the magnetic surfaces of the data storage location will corrupt the integrity of the magnetic media making it unfit for data storage and retrieval.

One common source of forces that tend to rotate the actuator assembly 112 during the non-operational state is external vibrations and shocks associated with the general use and environment in which a personal computer is used. This is especially true with laptop computers which are inherently subjected to handling and use that subjects the internal components to shocks and vibrations.

The latch 138 latchingly engages a pin 140 when the actuator assembly 112 is positioned as in FIG. 1 to retain the read/write heads 120 in the parked location. The pin 140 is supported by the E-block 115 of the actuator assembly 112. In this manner the actuator assembly 112 is in the latched mode.

Figure 2:
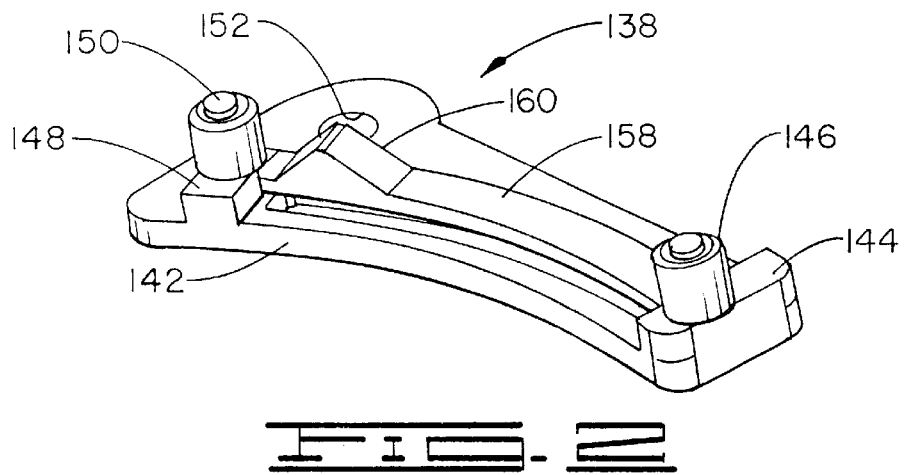
FIG. 2 is a perspective view of the latch of the disc drive of FIG. 1.

Turning now to FIG. 2, it will be noted the latch 138 has a base 142 with an upstanding portion 144 that supports an outer stop 146, and an upstanding portion 148 that supports an inner stop 150. In a preferred embodiment as illustrated in FIG. 1 the latch 138 is interposed between the poles 129 of the magnet assembly 128, and attached to the bottom pole 129 by an opening 152 that aligns with an attachment opening such as a threaded hole (not shown) in the bottom pole 129, and a positioning tab 154 (see FIG. 4) which aligns with a closely fitting opening 156 in the bottom pole 129.

Figure 3:
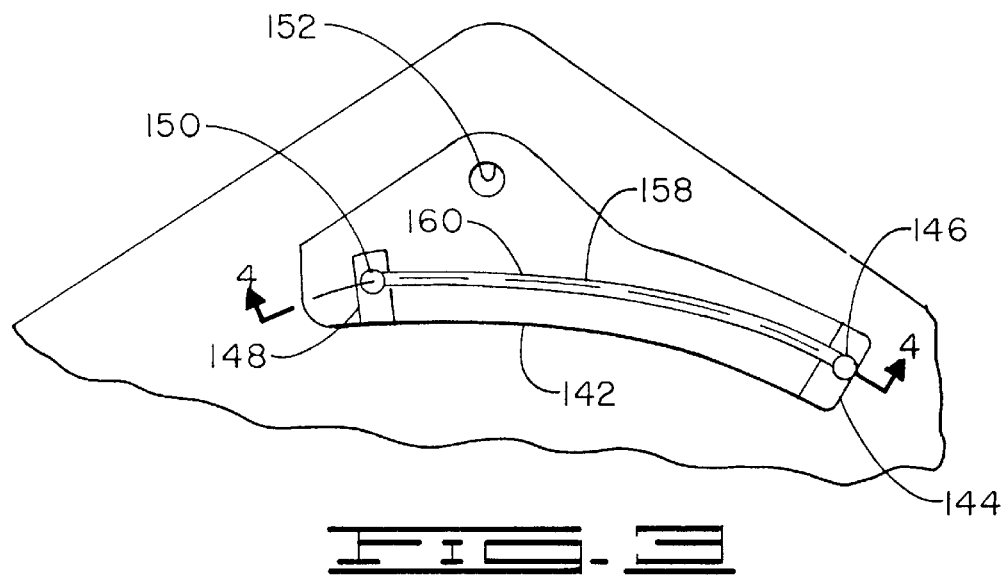
FIG. 3 is a top view of the latch of FIG. 2.

The latch 138 has a latch arm 158 that forms a generally triangular-shaped latch finger 160. FIG. 3 is a top view of the latch 138 showing the latch arm 158 in a preferred embodiment having a radius of curvature between the outer stop 146 and the inner stop 150, the radius of curvature substantially corresponding to that of the path of the pin 140 as the actuator assembly 112 pivots. In this manner the pin 140 is at all times positioned above the latch arm 158.

Figure 4:
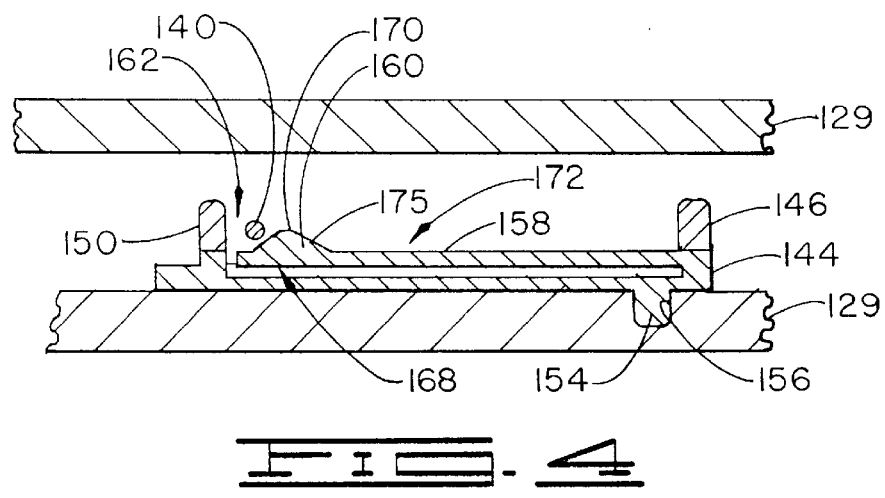
FIG. 4 is a partial sectional view of the latch of FIG. 2 taken generally along the line 4—4 of FIG. 3, schematically showing the latch in the latched mode.

FIG. 4 shows the latch arm 158 supported by the first upstanding member 144 at a proximal end and unencumbered at a distal end so as to be cantilevered from the first upstanding member 144. The cantilevered latch arm 158 biases the latch finger 160 to a position relative to the pin 140 of the actuator assembly 112 so as to form a latching groove 162 between the inner stop 150 and the latch finger 160. In this manner the pin 140 is constrained within the latching groove 162 so as to limit pivoting of the actuator assembly 112, thus retaining the read/write heads 120 in the parked location.

Turning now to FIG. 5, it will be noted that to move the actuator assembly 112 from the latched to the unlatched mode the actuator assembly 112 is pivoted by energizing the VCM 124 to move the pin 140 in a direction denoted by arrow 164. In doing so, the pin 140 pressingly engages an unlatching surface 166 of the latch finger 160. The lateral movement of the pin 140 is provided with a selected force sufficient to displace the latch finger 160 away from the biased position by deflecting the latch arm 158. It will be understood that in a preferred embodiment as shown in FIG. 5 the unlatching surface 166 is sloped in the direction of movement of the pin in moving from the latched mode, the slope facilitating the downward movement of the latch finger 160 as the pin 140 moves laterally against the unlatching surface 166.

A sufficient clearance 168 (see FIG. 4) is provided beneath the latch arm 158 to permit sufficient displacement of the latch finger 160 so that the pin 140 can pass by the latch finger 160. As the pin 140 moves beyond an apex 170 of the latch finger 160 and continues in a direction of the arrow 164 the latch finger 160 returns to the biased position of FIG. 4. In the biased position the latch finger 160 and the outer stop 146 form an unlatching groove 172 which receivingly constrains the pin 140 while the actuator moves to positions within the data storage location.

FIG. 6 shows the actuator assembly 112 having rotated to position the read/write heads 120 at an outer extremity of the data storage location, indicated by a diameter denoted 174, whereat the pin 140 abuttingly engages the outer stop 146 to prevent further pivoting of the actuator assembly 112. In this manner the actuator assembly 112 is freely positionable within the constraints of the pin 140 within the unlatching groove 172, corresponding to radial positions of the read/write heads 120 within the data storage location of the disc 108.

To move the actuator assembly 112 from the unlatched mode to the latched mode, the procedure described above is reversed. The actuator assembly 112 is pivoted to move the pin 140 in a direction opposite to that of arrow 164, so that the pin 140 pressingly engages a latching surface 175 of the latch finger 160. Continued movement of the pin 140 with a sufficient selected force displaces the latch finger 160 and allows the pin 140 to pass by the displaced latch finger 160, entering then into the latching groove 162.

It will be noted that the force required by the VCM 124 to move the pin 140 past the latch finger 160 is characteristically distinguishable from the force produced by normal shocks and vibrations. Shocks and vibrations produce transient forces of a magnitude insufficient to overcome the bias of the cantilevered latch arm 158 on the latch finger 160. It will be further noted that the force required to move the pin 140 by the latch finger 160 is greater than the force used to pivot the actuator assembly 112 during reading and writing sequences. As such, the latch finger 160 resists these normal forces and functions effectively as a positive stop. Only a selected sequence to latch or unlatch the actuator assembly 112 provides the selected force and duration necessary to overcome the bias of the latch arm 158 on the latch finger 160.

It will be understood by one skilled in the art that an advantage of the present invention lies in the ability to time the latch to respond to a selected force provided by the VCM 124.

First, the desired stiffness of the latch arm 158 is determined by the cross-sectional configuration, as is well known and defined by cantilever beam deflection relationship. Stiffness of the latch arm 158 is also manipulable by the selection of material constituency. In a preferred embodiment the latch is made from a 60% high modulus carbon filled PPS formed in a hot mold by the injection molding process.

Second, the slopes of the unlatching surface 166 and the latching surface 175 are selected to create the desired resistance to the latching/unlatching force. That is, a steeper slope requires a greater force and a greater duration to successfully move the actuator to a latched or unlatched position. The latch finger 160 in one preferred alternative embodiment has different slopes so that different forces are required in latching versus unlatching the actuators.

The present invention provides a latch (such as 138) for a disc drive (such as 100), wherein the disc drive has a rotating actuator assembly (such as 112) which supports and positions an array of read/write heads (such as 120) in data reading and writing relationship to a number of data discs (such as 108). The data discs have landing zones (such as 132) making a parked location wherein the read/write heads land when the disc drive is non-operational.

The actuator is rotated by a VCM (such as 124) that has a magnet assembly (such as 128) that includes a pair of opposing pole members (such as 129). The latch has a base (such as 142) attached to one of the pole members, and the latch is interposed between the pole members.

The latch has an inner stop (such as 150) which abuttingly engages a pin (such as 140) supported by the actuator to limit the rotation of the actuator at an inner extremity of the parked location. The latch furthermore has an outer stop (such as 146) which abuttingly engages the pin to limit the rotation of the actuator to radial positions within an outer extremity (such as 174) of the data storage location.

A cantilevered latch arm (such as 158) is positioned medially the inner and outer stops, having a latch finger (such as 160) which is biased by the latch arm to form a latching groove (such as 162) and an unlatching groove (such as 172). In a latched mode, pivoting of the actuator is limited by the constraint of the pin within the latching groove. To unlatch the actuator, the VCM moves the pin into pressing engagement with the latch finger with a force sufficient to overcome the cantilevered bias of the latch arm. The latch finger is thereby displaced and the pin passes into the unlatching groove.

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed. For example, the particular elements may vary depending on the particular application for the aerodynamic latch for a disc drive while maintaining substantially the same functionality without departing from the scope and spirit of the present invention.

What is claimed is:

1. A latch for use in a disc drive of the type having a storage disc with a parked location and a data storage location and a rotary actuator which supportingly moves a read/write head between the parked location and the data storage location, the actuator having a stop pin, the latch comprising:

a base member supported by the disc drive;

a latch arm having a proximal end and a distal end, the proximal end attached to the base member so that the latch arm is cantilevered from the base member; and a latch finger extending from the distal end of the latch arm, the latch finger biased by the latch arm to operably engage the actuator stop pin to retain the read/write head in the parked location, wherein the latch finger comprises a latching surface and unlatching surface, the actuator pivoting to pressingly engage the stop pin against the latching and unlatching surfaces.

2. The latch of claim 1 further comprising an inner stop which operably engages the actuator stop pin to limit the travel of the read/write head at an inner extremity of the parked location, wherein the latch finger cooperates with the inner stop to provide a latching groove in which the stop pin is constrained to retain the read/write head in the parked location.

3. The latch of claim 1 further comprising an outer stop which operably engages the actuator stop pin to limit the travel of the read/write head at an outer extremity of the data storage location.

4. The latch of claim 3 wherein the latch finger cooperates with the outer stop to provide an unlatching groove for receivingly engaging the actuator stop pin therein to retain the read/write head in the data storage location.

5. The latch of claim 3 wherein the stop pin pressingly engages the inner stop when the read/write head is at the inner extremity of the parked location.

6. The latch of claim 2 wherein the stop pin pressingly engages the outer stop when the read/write head is at the outer extremity of the data storage location.

7. The latch of claim 1, wherein the read/write head is moved from the data storage location to the parked location by moving the stop pin laterally in a direction substantially parallel to the latch arm and engaging the latching surface with sufficient force to displace the latch finger through deflection of the latch arm.

8. The latch of claim 1, wherein the read/write head is moved from the parked location to the data storage location by moving the stop pin laterally in a direction substantially parallel to the latch arm and engaging the unlatching surface with sufficient force to displace the latch finger through deflection of the latch arm.

9. A disc drive, comprising:

a base deck;

a disc pack supported by the base deck, the disc pack comprising:

a spindle motor supported by the base deck; and a disc supported by the spindle motor for rotation when the disc drive is operational, the disc having a data storage surface and a landing zone;

an actuator pivotally supported by the base deck, the actuator supporting a read/write head at a first end and a stop pin at a second end, the actuator moving the read/write head radially between the landing zone and the data storage surface; and a latch for retaining the actuator so the read/write head remains over the landing zone, the latch comprising:

a base member supported by the disc drive;

a latch arm having a proximal end and a distal end, the proximal end attached to the base member so that the latch arm is cantilevered from the base member; and a latch finger biased by the latch arm to operably engage the actuator stop pin to retain the read/write head over the landing zone, wherein the latch finger comprises a latching surface and unlatching surface, the actuator pivoting to pressingly engage the stop pin against the latching and unlatching surfaces.

10. The disc drive of claim 9 further comprising an inner stop which operably engages the actuator stop pin to limit the travel of the read/write head at an inner extremity of the landing zone, wherein the latch finger cooperates with the inner stop to provide a latching groove in which the stop pin is constrained to retain the read/write head over the landing zone.

11. The disc drive of claim 9 further comprising an outer stop which operably engages the actuator stop pin to limit the travel of the read/write head at an outer extremity of the data storage surface.

12. The disc drive of claim 11 wherein the latch finger cooperates with the outer stop to provide an unlatching groove for receivingly engaging the actuator stop pin therein to retain the read/write head over the data storage surface.

13. The disc drive of claim 9 wherein the read/write head is moved from the data storage surface to the landing zone by moving the stop pin laterally in a direction substantially parallel to the latch arm and engaging the latching surface with sufficient force to displace the latch finger through deflection of the latch arm.

14. The disc drive of claim 9 wherein the read/write head is moved from the landing zone to the data storage surface by moving the stop pin laterally in a direction substantially parallel to the latch arm and engaging the unlatching surface with sufficient force to displace the latch finger through deflection of the latch arm.

* * * * *